United States Patent [19]

Kimura

[11] Patent Number: 4,941,648
[45] Date of Patent: Jul. 17, 1990

[54] SHOCK ABSORBING DEVICE FOR VEHICULAR SEAT

[75] Inventor: Syuzaburo Kimura, Kanagawa, Japan

[73] Assignee: Ikeda Bussan Co., Ltd., Ayase City, Japan

[21] Appl. No.: 345,187

[22] Filed: May 1, 1989

[30] Foreign Application Priority Data

Jul. 29, 1988 [JP] Japan .................. 63-100961[U]

[51] Int. Cl.⁵ .............................................. F16F 5/00
[52] U.S. Cl. .................................... 267/131; 267/121; 267/218
[58] Field of Search .............. 267/117, 120, 121, 122, 267/124, 131, 133, 140.1 R, 140.1 A, 142, 143, 218

[56] References Cited

U.S. PATENT DOCUMENTS

| | | | |
|---|---|---|---|
| 2,410,967 | 11/1946 | Eaton | 267/218 X |
| 3,033,552 | 5/1962 | Ogden | 267/120 |
| 3,374,981 | 3/1968 | Stuckenberger et al. | 267/120 X |
| 3,430,444 | 3/1965 | Kamp | 267/117 |
| 3,668,870 | 6/1972 | Hall | 267/120 |
| 3,994,469 | 11/1976 | Swenson et al. | 248/400 |
| 4,638,982 | 1/1987 | Misher et al. | 267/131 |
| 4,844,428 | 7/1989 | Margolis et al. | 267/218 X |

FOREIGN PATENT DOCUMENTS

| | | |
|---|---|---|
| 625716 | 7/1949 | United Kingdom . |
| 890853 | 3/1962 | United Kingdom . |
| 959305 | 5/1964 | United Kingdom . |
| 1099841 | 1/1968 | United Kingdom . |
| 1282213 | 7/1972 | United Kingdom . |
| 1496546 | 12/1977 | United Kingdom . |

Primary Examiner—Duane A. Reger
Attorney, Agent, or Firm—Foley & Lardner, Schwartz, Jeffery, Schwaab, Mack, Blumenthal & Evans

[57] ABSTRACT

Herein disclosed is a shock absorbing device for a vehicular seat. The device comprises a link mechanism having lower and upper base members which are movable toward and away from each other; and a shock damper interposed between the lower and upper base members to damp shocks or vibrations applied to the same. The shock damper includes an axially expandable housing having lower and upper parts which are respectively secured to the lower and upper base members of the link mechanism; a diaphragm disposed in the housing to partition an interior of the housing into an air-filled part and a liquid-filled part; a partition wall disposed in the liquid-filled part to partition the same into first and second chambers, the partition wall having an aperture formed therethrough; and an orifice member axially movably disposed in the aperture of the partition wall, the orifice member having an orifice formed therethrough.

6 Claims, 3 Drawing Sheets

4,941,648

SHOCK ABSORBING DEVICE FOR VEHICULAR SEAT

BACKGROUND OF THE INVENTION

1. Field of the Invention

The present invention relates in general to a vehicular seat, and more particularly, to a shock absorbing device of the vehicular seat, which absorbs shock and vibration applied to the seat when the vehicle is moving and/or a person sits down on the seat

2. Description of the Prior Art

Hitherto, various types of vehicular seats have been proposed and put into practical use. Some of them are of a type which has a shock absorbing device mounted under a seat cushion part for providing a seat occupant with a comfortable sitting condition. However, some of the vehicular seats of this type fail to give satisfaction to manufacturing because of bulky, complicated and non-economical construction of the shock absorbing devices installed therein.

SUMMARY OF THE INVENTION

It is therefore an object of the present invention to provide a shock absorbing device for a vehicle seat, which is simple and compact in construction, economical to manufacture and efficient in operation.

According to the present invention, there is provided a shock absorbing device for a vehicular seat. The device comprises a link mechanism having lower and upper base members which are movable toward and away from each other; and a shock damper interposed between the lower and upper base members to damp shocks and vibrations applied to the same. The shock damper includes an axially expandable housing having lower and upper parts which are respectively secured to the lower and upper base members of the link mechanism; a diaphragm disposed in the housing to partition an interior of the housing into an air-filled part and a liquid-filled part; a partition wall disposed in the liquid-filled part to partition the same into first and second chambers, the partition wall having an aperture formed therethrough; and an orifice member axially movably disposed in the aperture of the partition wall, the orifice member having an orifice formed therethrough.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 3:
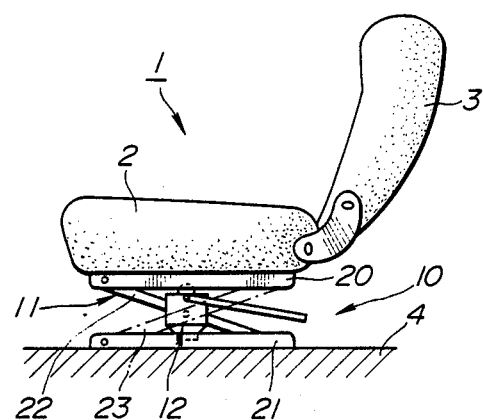
FIG. 3 is a side view of a vehicular seat to which the shock absorbing device of the invention is practically applied.

Referring to the drawings, particularly FIG. 3, there is shown a vehicular seat 1 to which a shock absorbing device 10 of the present invention is practically applied.

The vehicle seat 1 comprises a seat cushion part 2 and a seatback part 3 which is pivotally mounted to rear portion of the seat cushion part 2. The seat cushion part 2 is mounted on the shock absorbing device 10 which is, in turn, mounted on a vehicle floor 4.

As will become apparent as the description proceeds, the shock absorbing device 10 of the invention comprises generally a link mechanism 11 and a shock damper 12. The link mechanism 11 is arranged to vertically movably support the seat cushion part 2, and the shock damper 12 is arranged to damp various shocks and vibrations applied to the seat 1.

Figure 1:
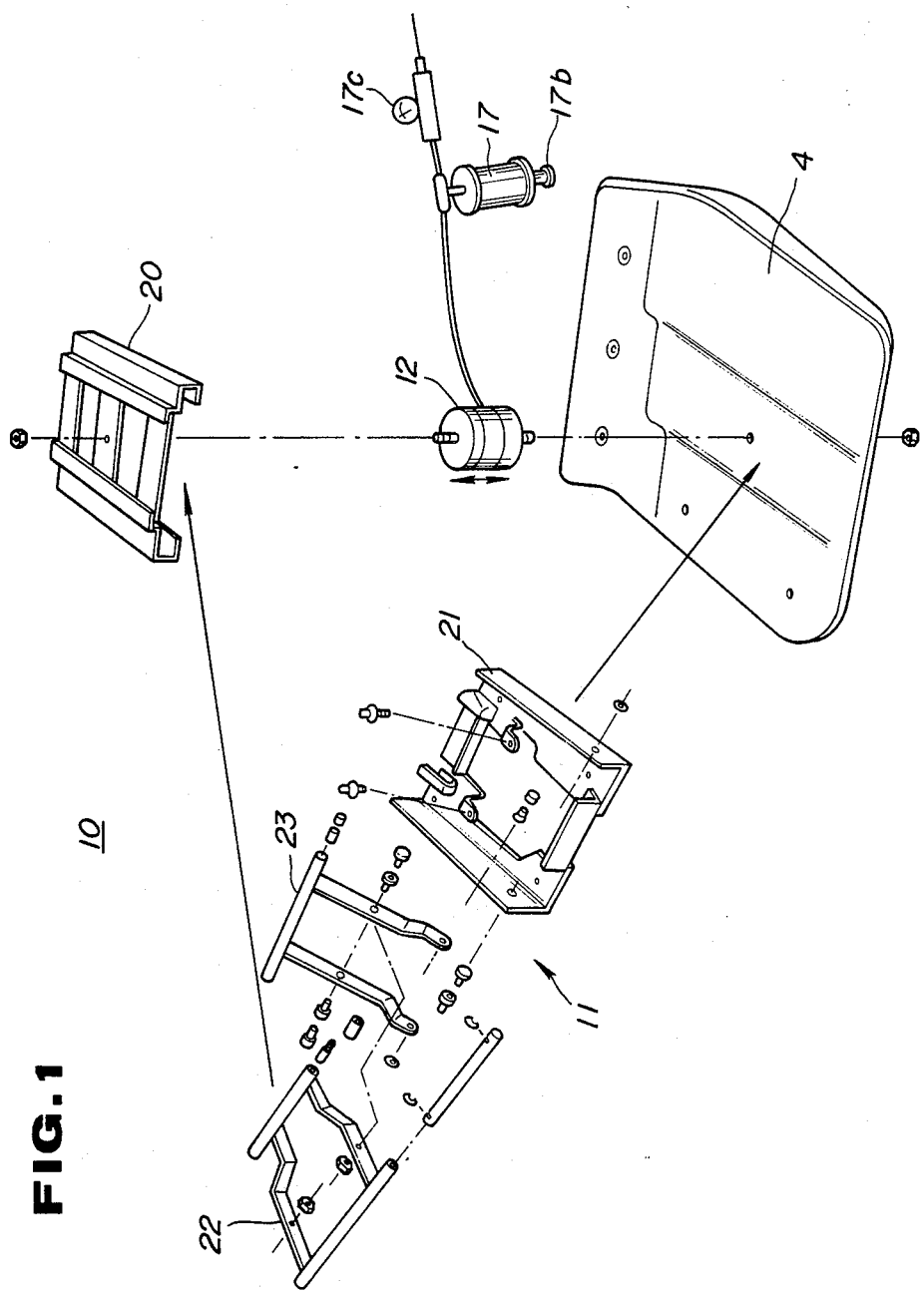
FIG. 1 is an exploded view of a shock absorbing device of the present invention.

As will be seen from FIG. 1, the link mechanism 11 comprises a lower base panel 21 secured to the vehicle floor 4, an upper base panel 20 secured to the seat cushion part 2 of the seat 1, and a known pantagraph mechanism which includes a pair of link arms 22 and 23 mutually pivoted and is arranged between the lower and upper base panels 21 and 20. Due to expanding and contracting movement of the pantagraph mechanism (22 and 23), the seat 1 on the link mechanism 11 is movable upward and downward relative to the vehicle floor 4.

As is understood from FIG. 1, the shock damper 12 is arranged between the lower and upper base panels 21 and 20 in parallel with the link mechanism 11.

Figure 2:
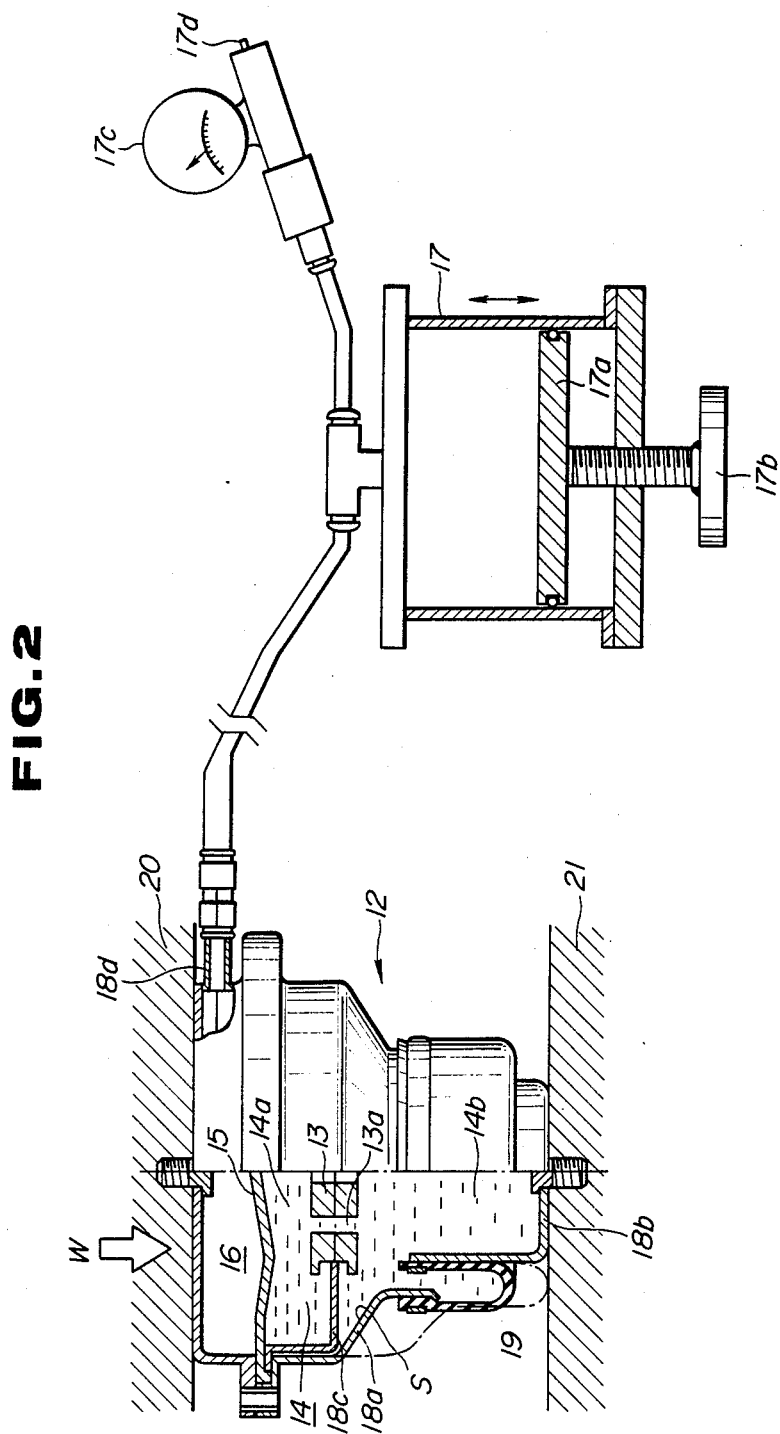
FIG. 2 is a sectional view of a shock damper and an air tank, which constitute an essential part of the shock absorbing device.

As is best seen from FIG. 2, the shock damper 12 comprises a cylindrical upper case 18a and a cylindrical lower case 18b which are connected through a turned-over annular rubber member 19. Thus, due to the nature of the turned over annular rubber member 19, the upper and lower cases 18a and 18b are axially movable relative to each other, changing an inner space S defined by the two cases 18a and 18b. The upper case 18a is bolted to the upper base panel 20, while the lower case 18b is bolted to the lower base panel 21. A diaphragm 15 is disposed in the upper case 18a to partition the inner space S into an upper space part 16 and a lower space part 14. The upper space part 16 is filled with compressed air, while the lower space part 14 is filled with a suitable liquid.

An apertured partition wall 18c is disposed in the liquid-filled space 14 to partition the same into first and second chambers 14a and 14b. An orifice member 13 is axially movably disposed in the aperture of the partition wall 18c. The orifice of the orifice member 13 is denoted by numeral 13a.

The air-filled part 16 has an air inlet 18d to which an air feed duct from an air tank 17 is connected. The air tank 17 is constructed to adjust the air pressure applied to the air-filled part 16 of the shock damper 12. The air tank 17 thus has a movable partition wall 17a which is axially moved by a bolt member 17b. That is, when the bolt member 17b is turned in a certain direction, the partition wall 17a is moved in a direction to contract or expand the interior of the tank 17 thereby to vary or adjust the air pressure applied to air-filled part 16. The air tank 17 has an air pressure gauge 17c which indicates the air pressure in the air-filled part 16. The air pressure gauge 17c has an air inlet valve 17d to which a compressed air source (not shown) is connectable.

When, in operation, the seat 1 is subjected to a shock or vibration due to, for example, sitting of a person thereon or cruising of the vehicle on a rough road, a certain load W (see FIG. 2) is suddenly applied to the shock damper 12. But this load W is suitably absorbed by the shock damper 12. That is, due to presence of the air-filled part 16, the shock damper 12 serves as an air cushion, and due to presence of the liquid-filled part 14, the vibrations (particularly, low frequency vibrations)

which would be transmitted from the vehicle to the seat 1 during the vehicle cruising are suitably absorbed.

It is to be noted that the height and softness of the seat cushion part 2 of the seat 1 can be adjusted by changing the air pressure applied to the shock damper 12, more particularly, to the air-filled part 16 of the same. It has been revealed that the vibration absorbing effect of the shock damper 12 can be controlled by changing the size of the orifice member 13.

What is claimed is:

1. A shock absorbing device for a vehicular seat, comprising:
    a link mechanism having lower and upper base members which are movable toward and away from each other; and
    a shock damper interposed between said lower and upper base members to dampen shocks and vibrations applied to the same, said shock damper including:
    an axially expandable housing having lower and upper parts which are respectively secured to said lower and upper base members of said link mechanism;
    a diaphragm disposed in said housing to partition an interior of said housing into an air-filled part and a liquid-filled part;
    a partition wall disposed in said liquid-filled lower part to partition the same into first and second chambers, said partition wall having an aperture formed therethrough; and
    an orifice member axially movably disposed in the aperture of said partition wall, so that said orifice member is selectively projectable into said first and second chambers, said orifice member having an axially extending orifice formed therethrough.

2. A shock absorbing device as claimed in claim 1, in which said housing comprises a cylindrical upper case, a cylindrical lower case and a turned over annular rubber member through which said upper and lower cases are connected.

3. A shock absorbing device as claimed in claim 2, in which said diaphragm and said partition wall are arranged in said upper case.

4. A shock absorbing device as claimed in claim 3, in which said air-filled part is connected to a compressed air supplier.

5. A shock absorbing device as claimed in claim 4, in which said compressed air supplier comprises an air tank into which a compressed air is supplied, a partition wall movably disposed in the air tank, and a bolt member for moving the partition wall when turned about its axis.

6. A shock absorbing device as claimed in claim 1, in which said link mechanism further comprises a pair of link arms which are pivotally connected to each other to constitute a so-called pantagraph mechanism.

* * * * *